(12) United States Patent
Johnson et al.

(10) Patent No.: US 10,686,720 B2
(45) Date of Patent: Jun. 16, 2020

(54) INTEGRATED CAPACITY AND ARCHITECTURE DESIGN TOOL

(71) Applicant: INTERNATIONAL BUSINESS MACHINES CORPORATION, Armonk, NY (US)

(72) Inventors: Randy S. Johnson, O'Fallon, MO (US); Tedrick N. Northway, Alachua, FL (US); Peter T. Vasiljevic, Seattle, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 15/883,270

(22) Filed: Jan. 30, 2018

(65) Prior Publication Data

US 2018/0159794 A1 Jun. 7, 2018

Related U.S. Application Data

(63) Continuation of application No. 14/468,797, filed on Aug. 26, 2014, now Pat. No. 9,935,892, which is a continuation of application No. 11/869,318, filed on Oct. 9, 2007, now Pat. No. 8,856,332.

(51) Int. Cl.
*G06F 15/173* (2006.01)
*H04L 12/911* (2013.01)
*H04L 12/24* (2006.01)

(52) U.S. Cl.
CPC ............ *H04L 47/78* (2013.01); *G06F 15/173* (2013.01); *H04L 41/50* (2013.01)

(58) Field of Classification Search
CPC .............................. H04L 12/911; H04L 12/24
See application file for complete search history.

(56) References Cited

U.S. PATENT DOCUMENTS

| 4,916,608 | A | | 4/1990 | Shultz |
| 5,608,638 | A | * | 3/1997 | Tain .................... G06F 17/5068 700/121 |
| 5,668,995 | A | | 9/1997 | Bhat |
| 5,715,394 | A | * | 2/1998 | Jabs ...................... H04L 41/042 370/401 |

(Continued)

OTHER PUBLICATIONS

Zhang et al., "A Capacity Planning Framework for Multi-tier Enterprise Services with Real Workloads", Integrated—Network Management, IFIP/IEEE International Symposium, 2007; pp. 781-784.

(Continued)

*Primary Examiner* — David E Choi
(74) *Attorney, Agent, or Firm* — Isaac J. Gooshaw; Andrew M. Calderon; Roberts Calderon Safran & Cole, P.C.

(57) ABSTRACT

A method implemented in a computer infrastructure having computer executable code, including consolidating collected capacity architecture information, which includes data for installed resources, allocated resources and reserved resources and determining available resources based on the collected capacity architecture information. Additionally, the method includes displaying an indication the available resources and performing capacity planning based on the collected capacity architecture information and the available resources.

20 Claims, 11 Drawing Sheets

(56) References Cited

U.S. PATENT DOCUMENTS

| | | | |
|---|---|---|---|
| 5,781,624 A | 7/1998 | Mitra et al. | |
| 6,086,618 A | 7/2000 | Al-hilali et al. | |
| 6,219,649 B1 | 4/2001 | Jameson | |
| 6,247,109 B1* | 6/2001 | Kleinsorge | G06F 9/461 |
| | | | 711/153 |
| 6,253,318 B1 | 6/2001 | Varghese et al. | |
| 6,336,127 B1 | 1/2002 | Kurtzberg et al. | |
| 6,357,036 B1* | 3/2002 | Eka | G06F 17/5068 |
| | | | 716/112 |
| 6,516,348 B1* | 2/2003 | MacFarlane | H04L 41/147 |
| | | | 370/232 |
| 6,581,189 B1* | 6/2003 | Tain | G06F 17/5068 |
| | | | 703/1 |
| 6,664,978 B1* | 12/2003 | Kekic | H04L 41/0213 |
| | | | 709/203 |
| 6,725,454 B1 | 4/2004 | Nagel et al. | |
| 6,862,623 B1* | 3/2005 | Odhner | G06Q 10/06 |
| | | | 709/226 |
| 6,898,564 B1 | 5/2005 | Odhner et al. | |
| 6,907,395 B1 | 6/2005 | Hunt et al. | |
| 6,957,435 B2 | 10/2005 | Armstrong et al. | |
| 7,082,521 B1 | 4/2006 | Nanja | |
| 7,096,469 B1* | 8/2006 | Kubala | G06F 9/5077 |
| | | | 718/100 |
| 7,200,530 B2 | 4/2007 | Brown et al. | |
| 7,552,208 B2* | 6/2009 | Lubrecht | G06F 11/3442 |
| | | | 709/223 |
| 7,698,348 B2* | 4/2010 | Walker | G06F 16/24552 |
| | | | 707/790 |
| 7,707,015 B2* | 4/2010 | Lubrecht | G06Q 10/06 |
| | | | 703/6 |
| 7,725,356 B2* | 5/2010 | Shah | G06F 9/44505 |
| | | | 705/27.1 |
| 8,078,728 B1* | 12/2011 | Pollan | G06F 9/5077 |
| | | | 709/223 |
| 8,301,740 B2* | 10/2012 | Gingell, Jr. | G06F 9/5072 |
| | | | 709/223 |
| 8,306,841 B2* | 11/2012 | Clarke | G06Q 10/063118 |
| | | | 705/7.23 |
| 8,856,332 B2* | 10/2014 | Johnson | G06F 15/173 |
| | | | 709/226 |
| 2002/0156824 A1 | 10/2002 | Armstrong et al. | |
| 2004/0215774 A1* | 10/2004 | Birkestrand | G06F 9/5011 |
| | | | 709/225 |
| 2004/0267897 A1* | 12/2004 | Hill | G06F 9/505 |
| | | | 709/217 |
| 2005/0044228 A1* | 2/2005 | Birkestrand | G06F 9/5011 |
| | | | 709/226 |
| 2005/0138013 A1* | 6/2005 | Walker | G06F 16/24552 |
| 2005/0195749 A1* | 9/2005 | Elmasry | H04L 41/145 |
| | | | 370/252 |
| 2005/0259683 A1* | 11/2005 | Bishop | H04L 41/0896 |
| | | | 370/468 |
| 2006/0009944 A1* | 1/2006 | Shah | G06F 9/44505 |
| | | | 702/123 |
| 2006/0031268 A1* | 2/2006 | Shutt | G06F 16/278 |
| 2006/0053043 A1* | 3/2006 | Clarke | G06Q 10/06311 |
| | | | 705/7.17 |
| 2006/0080656 A1* | 4/2006 | Cain | G06F 8/65 |
| | | | 717/174 |
| 2006/0136761 A1* | 6/2006 | Frasier | G06F 9/505 |
| | | | 713/320 |
| 2006/0159021 A1* | 7/2006 | Asghar | H04L 41/145 |
| | | | 370/237 |
| 2006/0160540 A1* | 7/2006 | Strutt | G01S 11/06 |
| | | | 455/440 |
| 2006/0161883 A1* | 7/2006 | Lubrecht | G06Q 10/06 |
| | | | 717/104 |
| 2006/0161884 A1* | 7/2006 | Lubrecht | G06F 11/3442 |
| | | | 717/104 |
| 2006/0277155 A1* | 12/2006 | Bell | G06F 9/5077 |
| 2006/0288348 A1* | 12/2006 | Kawamoto | G06F 9/5077 |
| | | | 718/105 |
| 2007/0179998 A1* | 8/2007 | Swanepoel | G06F 11/1451 |
| 2008/0155535 A1* | 6/2008 | Daniels | G06Q 10/06 |
| | | | 718/1 |
| 2008/0298313 A1* | 12/2008 | Salminen | H04L 63/08 |
| | | | 370/329 |
| 2009/0094355 A1* | 4/2009 | Johnson | G06F 15/173 |
| | | | 709/223 |
| 2009/0164201 A1* | 6/2009 | Celli | H04L 41/20 |
| | | | 703/21 |
| 2014/0365667 A1* | 12/2014 | Johnson | G06F 15/173 |
| | | | 709/226 |

OTHER PUBLICATIONS

Teamquest, "Service Oriented Architecture and What it Means to Capacity Management". IT Knowledge exchange Series, 2006; pp. 1-5.

"How to Select a Storarage Capacity Planning Tool", ComputerWeekly.com, Nov. 16, 2007; 4 pages.

"Ultility Software Enables Drag-and-Drop Resource Allocation", www.polyserve.com, 2005; 2 Pages.

* cited by examiner

| Name | SN / ODCS Hostname | Customer | Description | Values (Fixed / Entitled / Virtual) | E | HA | |
|---|---|---|---|---|---|---|---|
| s70-07 | 1\*\*\*06E | XYZ | p570 - 8LPAR HA (16x64) Boulder- [23] { } <BLD-HMC01> | 2 LPARS (12x32) | | , | Confirmed via HMC |
| | NB\*\*\*277 | XYZ | Reflexis-Prod: WAS Cluster Server #2 | (4x16) | so | . | |
| | NB\*\*\*275 | XYZ | rPOS-Prod: DB Server #2 | (8x16) | so | Active <--AA--> NB\*\*\*274 | |
| | CUoD | | | (4.00x0) | | ' | |
| | Cap Reserve | | | (0.00x8) | | , | |
| | Available | | | (0.00x24) | | . | |

Figure 4

| | Description | Installed | Allocated | Reserved | Available |
|---|---|---|---|---|---|
| FLPAR | | 8 | 3 | | 5 |
| CP | 1.9GHz | 16 | Fixed 9 | 0 4-CUoD | 3.00 |
| RAM (GB) | 8GB DIMMS | 64 | 48 | 8 0 - CUoD | 8 |
| HBA | 2Gb | 16 | 6 | | 10 |
| HDD | 73.4GB | 16 | 6 | | 10 |
| Disk Config | | 2x73.4GB (Mirror) | | | |
| Port | 16nics@ 10/100/1000 | 32 | 9 | | 23 |

Figure 6

| HMC | SN | Name | 905 {L | CP | RAM} | 910 {L | CP | RAM} | 915 {CP | CUoD | RAM} | 920 {L | CP | RAM} | 925 : |
|---|---|---|---|---|---|---|---|---|---|---|---|---|---|---|---|
|  |  |  |  |  |  |  |  |  |  |  |  |  |  |  | BLD-HMC09 |
|  | 1***A8D | s70-01 | 8 | 16 | 64 | 2 | 15 | 49 | 0 | 1 | 2 | 6 | 0 | 13 |  |
|  | 1***0DE | s70-02 | 8 | 16 | 64 | 2 | 15 | 56 | 0 | 1 | 4 | 6 | 0 | 4 |  |
|  | 1***44E | s70-12 | 8 | 16 | 64 | 4 | 14 | 44 | 0 | 2 | 8 | 4 | 0 | 12 |  |
|  | 1***45E | s70-13 | 8 | 16 | 64 | 2 | 11 | 24 | 0 | 4 | 8 | 6 | 1 | 32 |  |

Figure 9

| Name | SN / ODCS Hostname | Description: (Type-Mod) [Bldg] {Grid} <HMC> | Values (Fixed / Entitled / Virtual) | H | ! A A |
|---|---|---|---|---|---|
| *_LEXp20 | 1**55A | p570 - 0LPAR HA (16x256) {SPP = 12} Lexington-[202-001]{166-68} <LEX-HMC08> | (Fcp [0] / Ecp [11.7] / Vcp {63} / 120GB) (YELLOW) | - | A A |
| *_LEXp21 | 1**3AC | p570 - 0LPAR HA (16x256) {SPP = 12} Lexington-[202-001]{166-70} <LEX-HMC07> | (Fcp [0] / Ecp [12] / Vcp {64} / 130GB) (RED) | - | |
| *_LEXp22 | 1**26E | p570 - 0LPAR HA (16x256) {SPP = 12} Lexington-[202-001]{176-64} <LEX-HMC08> | (Fcp [0] / Ecp [11.4] / Vcp {38} / 58GB) (YELLOW) | - | |
| *_LEXp23 | 1**27E | p570 - 0LPAR HA (16x256) {SPP = 12} Lexington-[202-001]{176-66} <LEX-HMC09> | (Fcp [0] / Ecp [12] / Vcp {42} / 64GB) (RED) | - | |
| *_LEXp24 | 1**28E | p570 - 0LPAR HA (16x256) {SPP = 12} Lexington-[202-001]{176-68} <LEX-HMC07> | (Fcp [0] / Ecp [11.8] / Vcp {40} / 50GB) (YELLOW) | - | |
| *_LEXp25 | 1**29E | p570 - 0LPAR HA (16x256) {SPP = 12} Lexington-[202-001]{176-70} <LEX-HMC09> | (Fcp [0] / Ecp [11.8] / Vcp {40} / 56GB) (YELLOW) | - | |
| *_LEXp26 | 1**45E | p570 - 0LPAR (16x256) {SPP = 12} Lexington-[] {} <> | (Fcp [0] / Ecp [0] / Vcp {0} / 0GB) (GREEN) | - | |
| *_LEXp27 | 1**98B | p570 - 0LPAR (16x256) {SPP = 12} Lexington-[] {} <> | (Fcp [0] / Ecp [0] / Vcp {0} / 0GB) (GREEN) | - | |

Figure 10

INTEGRATED CAPACITY AND ARCHITECTURE DESIGN TOOL

FIELD OF THE INVENTION

The present invention relates to a method and system for architecting and allocating the capacity requirements for a shared customer in an On Demand environment.

BACKGROUND OF THE INVENTION

Capacity architecture involves the design of information technology (IT) components and capacity, e.g., assets and servers, for one or more clients. Moreover, within a shared On Demand environment, capacity architecture involves designing an IT system for, e.g., a client in a shared environment. That is, in a shared On Demand environment, a plurality of clients may share the same IT resources, e.g., components, capacity and servers.

A Delivery Architect or a capacity planning and architect team may perform capacity planning and architecture. Conventionally, a Delivery Architect communicates information in various forms from a myriad of sources (e.g., multiple databases, spreadsheets, etc.). Conventionally, in order to perform capacity architecture, the Delivery Architect would need to reference dozens of individual spreadsheets located in multiple document repositories in order to keep track of the various components that comprised the assets and servers in an On Demand Datacenter (ODCS). Some spreadsheets contain information about specific customer servers and assets, while other spreadsheets contain information for the entire datacenter. Furthermore, some spreadsheets function as ways to track allocated resources on assets, while others are used to keep track of which host names were in use or available. Additionally, another set of spreadsheets may be used as a means to visually display which servers were assigned to which asset, so that this information could be shown to a customer.

Delivery Architecture tasks require the information contained in many (if not all) of these dozens of spreadsheets to be regularly updated to maintain accuracy. Having this updated information is important to a Delivery Architect to ensure, e.g., servers delivered in the ODCS environment are compliant with established ODCS Architecture Standards. However, conventionally, it is extremely confusing and difficult to manage and time consuming to locate and update the information contained in these spreadsheets accurately, which leads to errors in allocation and design.

Additionally, a major output of the Delivery Architect function is the documenting of specific build instructions into a "Buildsheet". The Buildsheet is a large, comprehensive spreadsheet used by System Administrators as the primary source of information that is needed to successfully build and configure assets and servers. The Buildsheet is vital and necessary in order to build servers, but it is cumbersome, complicated and requires intensive labor to maintain. Conventionally, each new version of a Buildsheet is the result of manual manipulation by either the Delivery Architect, or a NID (Network Implementation Design) Designer. However, as the Buildsheets are manually generated, they are rarely updated and/or accurate for continuous usage.

Accordingly, there exists a need in the art to overcome the deficiencies and limitations described hereinabove.

SUMMARY OF THE INVENTION

In a first aspect of the invention, a method implemented in a computer infrastructure having computer executable code, comprises consolidating collected capacity architecture information, which comprises data for installed resources, allocated resources and reserved resources and determining available resources based on the collected capacity architecture information. Additionally, the method comprises performing capacity planning based on the collected capacity architecture information and the available resources.

In an additional aspect of the invention, a design tool is implemented in a computer infrastructure having executable program code operable to consolidate collected capacity architecture information, which comprises capacity data for installed resources, allocated resources and reserved resources. Additionally, the executable program code is operable to determine available resources based on the collected capacity architecture information and display an indication the available resources for allocation of the available resources.

In a further aspect of the invention, a computer program product comprises a computer usable medium having readable program code embodied in the medium. The computer program product includes at least one component to consolidate collected capacity architecture information, which comprises capacity data for installed resources, allocated resources and reserved resources. Additionally, the at least one component is further operable to determine available resources based on the collected capacity architecture information and display an indication the available resources for allocation of the available resources.

BRIEF DESCRIPTION OF THE DRAWINGS

The present invention is described in the detailed description which follows, in reference to the noted plurality of drawings by way of non-limiting examples of exemplary embodiments of the present invention.

FIG. 4 shows an exemplary layout structure view according to an aspect of the invention;

FIG. 6 shows an exemplary hardware resource table for a fixed system according to an aspect of the invention;

FIGS. 9 and 10 show exemplary dashboard views according to aspects of the invention.

DETAILED DESCRIPTION OF THE INVENTION

Figure 1:
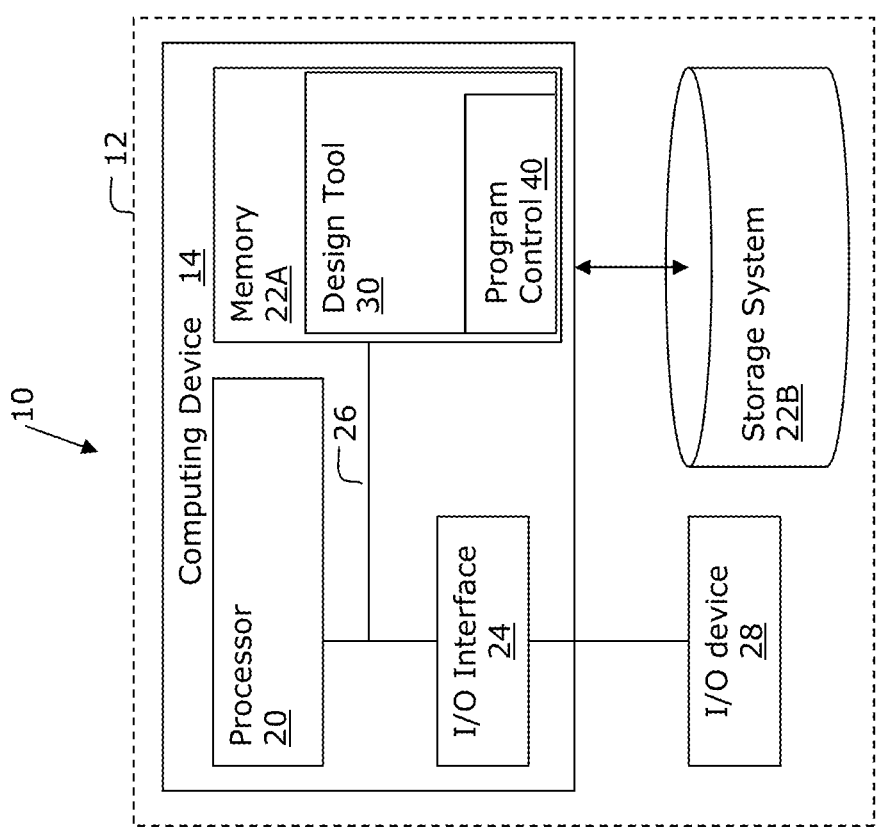
FIG. 1 shows an illustrative environment for managing the processes in accordance with the invention.

The invention relates to a method and system for architecting and allocating capacity requirements for shared customers in an On Demand environment. By implementing the invention, a Delivery Architect may perform capacity planning and/or architectural configuration.

A configuration management tool, such as a Configuration Management Integrator (CMI), may have assisted with, e.g., hostname management, server/asset relationship, location information. However, CMI tools lack any capacity planning or architectural configuration features. Additionally, CMI tools do not provide any mechanism that would allow the Delivery Architect to see, e.g., how many CPUs are being used by logical servers, how many Capacity Upgrade On Demand (CUoD) processors are still in-active, and how many CUoD processors remain that could be applied to new or existing logical partitions (LPARS). Nor do CMI tools have a mechanism that would allow the "testing" of different CPU or RAM allocation schemes. Furthermore, CMI tools do not provide a mechanism to specify connections and server relationships, for example, document how the hard drives, network interface cards (NICs), Storage Area Networks (SAN) Volume Groups, cluster relationships, or virtual local area networks (VLANs) are arranged for an LPAR, e.g., drive mirror versus single drive, or dual port cards versus multiple SAN fabric.

Aspects of the Invention

According to the invention, an Integrated Capacity and Architecture design tool provides a central repository of configuration information associated with each customer server in the ODCS environment in an integrated database. It should be understood, however, that the present invention may be utilized in non-ODCS environments and architectures, and other environments and architectures are contemplated by the invention. The design tool provides the central repository so that all Delivery Architects (e.g., for a particular ODCS) may look at the same information in an organized manner. The design tool also tracks data including, for example, server hostnames, asset serial numbers, city, building and grid locations, amongst other data. Additionally, the design tool extends the functionality of existing configuration management and incorporates capacity planning and architectural configuration aspects. The design tool can also record the manner in which the components are assembled. By implementing this aspect of the invention, the Delivery Architect may record the information associated with each customer in the ODCS environment so it may be easily retrievable and maintained by the Delivery Architect or other Delivery Architects.

Additionally, the design tool keeps track and displays available resources. By implementing this aspect of the present invention, a Delivery Architect is able to quickly make capacity/boarding decisions. Moreover, the design tool is aware of IBM® PSERIES® Virtualization and can provide information on virtualized CPU and RAM available capacity while taking into consideration variables such as oversubscription and entitled CPU. (IBM and pSeries are registered trademarks of International Business Machines Corporation in the United States, other countries, or both.) In embodiments, this virtualization information may be extremely helpful to a Delivery Architect because of the number of fractional CPUs that may need to be tracked on large Frames. (Conventionally, the Delivery Architect had to track this virtualization information in a side spreadsheet simply to validate the mathematics.) Moreover, in embodiments, the design tool has the potential to preprogram various CPU/RAM assignment and oversubscription schemes. By implementing this aspect of the invention, the Delivery Architect may account for virtualized resources when determining a capacity architecture.

Moreover, the delivery architect can quickly identify unallocated capacity and model multiple scenarios to identify the optimal solution to the customer's requirements. Additionally, other what-if scenarios may be analyzed, which can identify configuration changes to support the optimal solution. By implementing this aspect of the invention, a Delivery Architect may be provided with a range of capacity scenarios for planning.

Once the optimal solution is established, using the design tool, the Delivery Architect can reserve the configuration assets to prevent another Delivery Architect from assigning those assets. That is, a number of Delivery Architects may use the same design tool to perform capacity planning and architecture for the same shared resources. By implementing this aspect of the invention, once a Delivery Architect has determined an optimal solution, e.g., comprising particular assets, the Delivery Architect may reserve those particular assets in the design tool. Subsequently, a second Delivery Architect may observe that those particular assets have already been reserved. Thus, the second Delivery Architect would be prevented from allocating those reserved assets.

Additionally, in embodiments, the design tool can export specific configuration information from the design tool and generate portions of a Buildsheet. Moreover, according to a further embodiment, the design tool may produce a complete architectural diagram documenting the solution. By implementing these aspects of the invention, the opportunity for error in generating or updating the Buildsheets is reduced and a consistent Buildsheet format may be created. Moreover, the design tool may be used to display Build information On-Demand, eliminating the need for the cumbersome Buildsheets altogether.

System Environment

FIG. 1 shows an illustrative environment 10 for managing the processes in accordance with the invention. To this extent, the environment 10 includes a computer infrastructure 12 that can perform the processes described herein.

The computer infrastructure 12 includes a computing device 14 that comprises a design tool 30 operable to record information on installed, allocated and reserved resources and determine available resources for fixed and virtualized systems, display an indication of available resources, generate asset/server relationship views, layout structure views, configuration views, resource table views and dashboard views, and provide for oversubscriptions, reserve capacity, "what if" scenario testing and buildsheet generation, e.g., the processes described herein. By utilizing the design tool 30, a user (e.g., a Delivery Architect) may determine a best configuration for a customer in a shared On Demand environment.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc. In embodiments, the displays may be used to show a Delivery Architect the various views generated by the design tool 30, as set forth below.

The processor 20 executes computer program code (e.g., program control 40), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Swim Lane Diagram

The steps of the swim lane diagrams described herein may be implemented in the environment of FIG. 1. The swim lane diagrams may equally represent a high-level block diagram or flow diagram of the invention. The steps of the swim lane diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 2A:
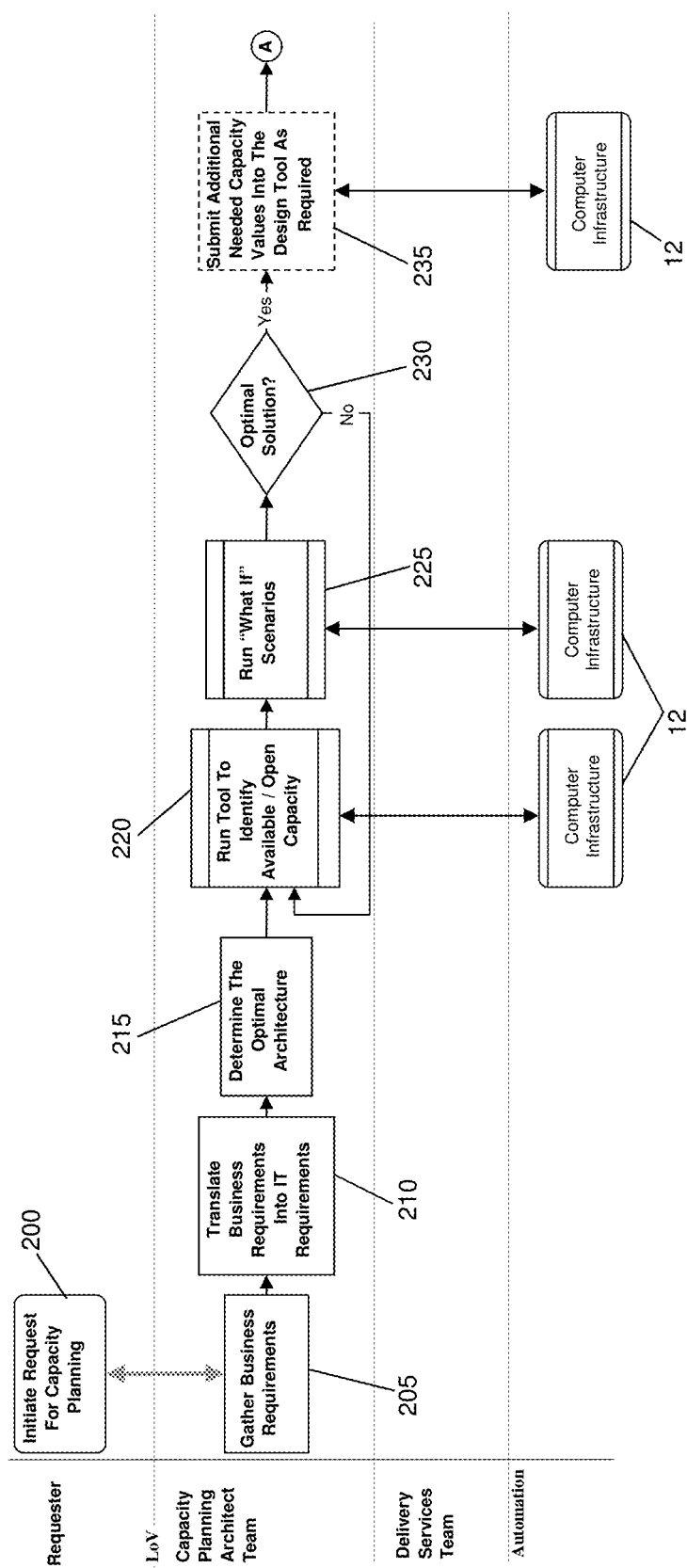
FIGS. 2A and 2B show an exemplary flow diagram for practicing aspects of the invention.
Figure 2B:
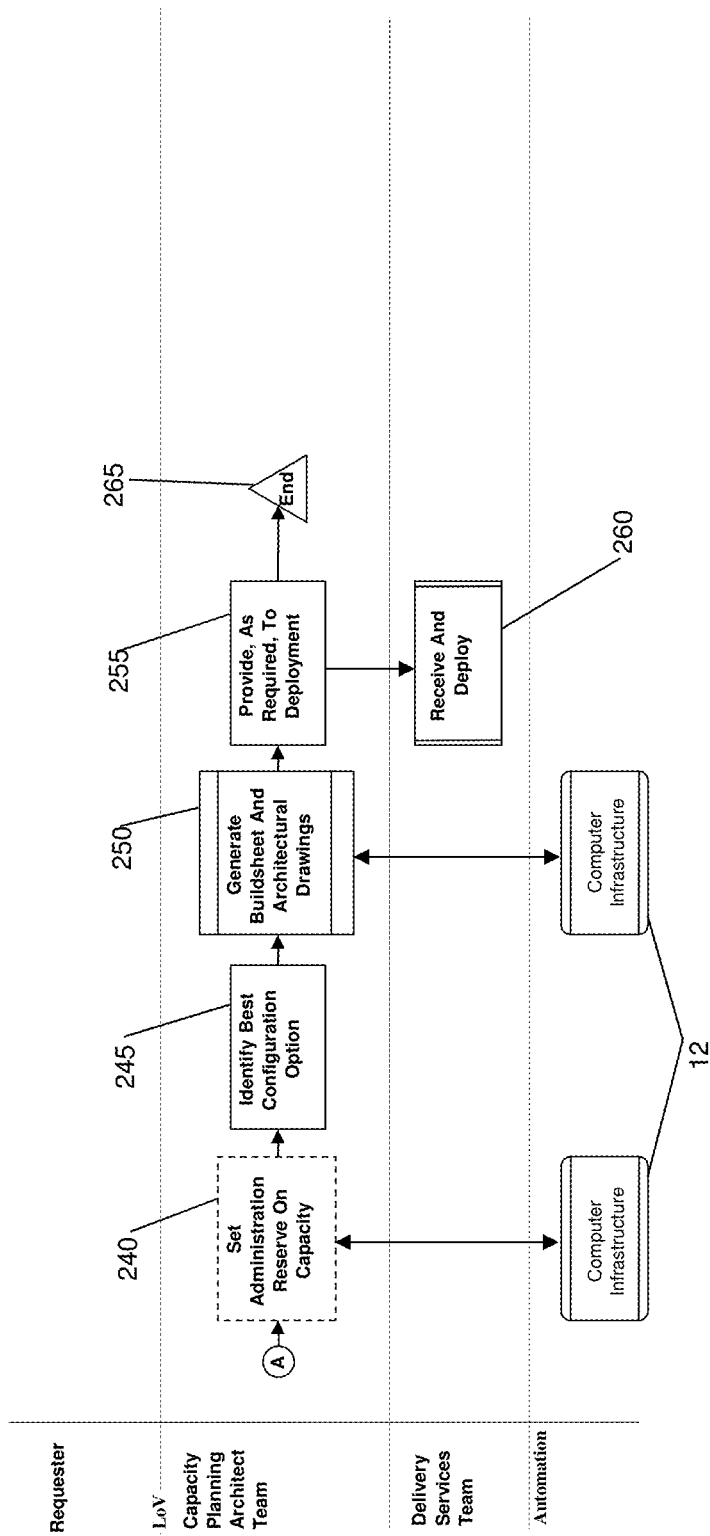

FIGS. 2A and 2B show an exemplary swim lane diagram for performing steps of the invention. At step 200, a request (Requester process) for capacity planning may be initiated. This may comprise an authorized requester, e.g., a client or customer, submitting a request for capacity to, e.g., a capacity planning and architect team or a Delivery Architect. At step 205, the capacity planning and architect team gathers all of the required business requirements for the request from the requestor. At step 210, the capacity planning and architect team translates the business requirements into information technology (IT) requirements which will address the request needs. At step 215, the capacity planning and architect team reviews the environment/IT needs for the request and determines the correct architecture to satisfy the request. It should be noted, that as new architectures present themselves or changes to existing architectures, the design tool is made "aware" of these changes and is updated. At step 220, the team executes the design tool 30 (as indicated by the connection to the computer infrastructure 12) and the design tool processing provides information on the available/open capacity to address the request. At step 225, the capacity planning and architect team may execute the design tool to review potential solutions for the request. This may include running "what if" scenarios where parameters may be changed and the resultant architecture compared. In embodiments, a Delivery Architect using the design tool may determine, for example, amongst other determinations:

what would happen if LPARS were moved from one frame to another?;
would such a move provide the resources required for the request?;
what is the impact to the servers in doing so?;
what if the over subscription values were modified?;
would modifying the over subscription values address the requirement?; and
what is the impact to the servers/other assets?

At step 230, the capacity planning and architect team determines if one of the scenarios tested is the best solution to the request. If, at step 230, it is determined that an optimal solution has not been found, then the process continues at step 220. If, at step 230, it is determined that an optimal solution has been found, then the process continues at step 235. At step 235, if required, the capacity planning and architect team may submit any additional needed capacity into the design tool, e.g., by modifying oversubscription values, so that the added capacity will be considered and accounted for in the processing. As it may be an optional step, step 235 is shown in hidden lines.

As shown in FIGS. 2A and 2B the process continues from FIG. 2A to FIG. 2B through connector A. Thus, continuing with FIG. 2B, at step 240, the capacity planning and architect team may reserve the capacity in the design tool and the association of the identified configuration may be reserved in the design tool. As it may be an optional step, step 240 is shown in hidden lines. At step 245, the capacity planning and architect team identifies and selects the best configuration for addressing the request based on the results of the design tool. At step 250, the design tool produces the Buildsheets and the architectural drawings for deployment to the requestor. At step 255, the capacity planning and architect team provides the design tool generated data, e.g., the Buildsheets and/or architectural drawings, to a deployment team to deploy the solution in a more timely and accurate manner. At step 260, the deployment team receives the design tool generated data, e.g., Buildsheets and/or architectural drawings, and begins to deploy the solution as defined by the design tool. At step 265, the process ends.

Design Tool

In embodiments, the design tool 30 may be a LOTUS NOTES® Application; one specific for XSERIES®/WINDOWS® and LINUX® platforms, another for PSERIES and other UNIX® based platforms. In additional embodiments, the design tool may be a different type of application, e.g., C++. (Lotus Notes and xSeries are registered trademarks of International Business Machines Corporation in the United States, other countries, or both. WINDOWS is a registered trademark of Microsoft Corporation in the United States, other countries, or both. LINUX is the registered trademark of Linus Torvalds in the United States, other countries, or both. UNIX is a registered trademark of The Open Group in the United States and other countries.) In embodiments, each instance of the design tool contains a number of forms, fields, views and scripts that organize and display the information.

Asset/Server Relationship

Figure 3:
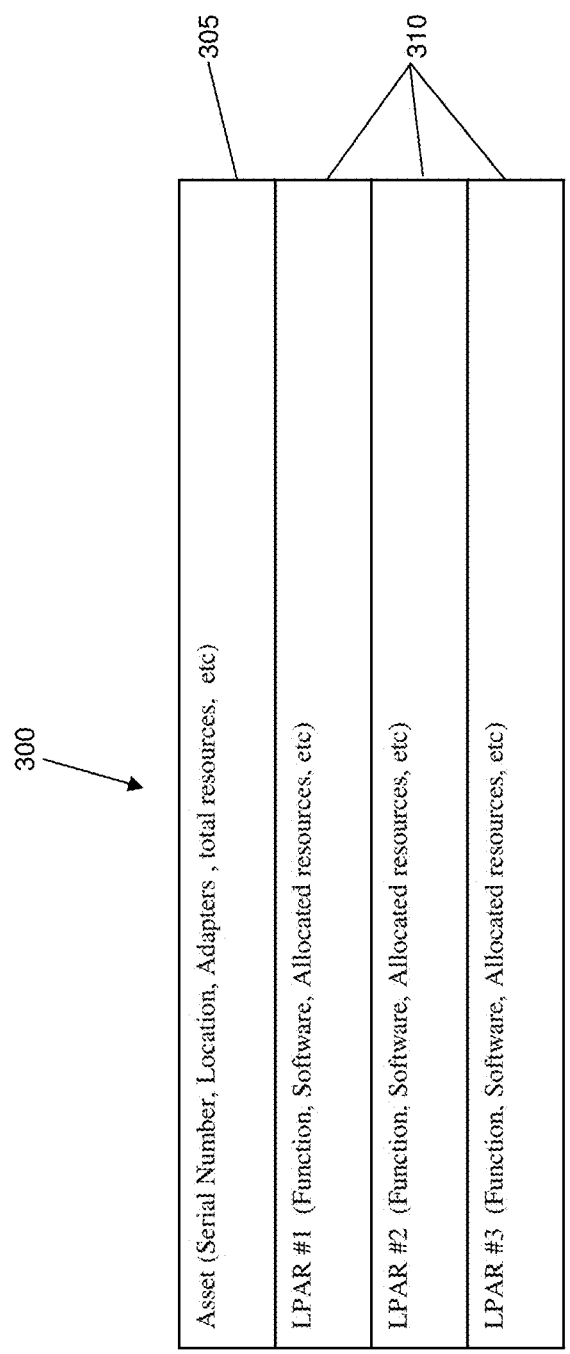
FIG. 3 shows an exemplary asset/server relationship view according to an aspect of the invention.

FIG. 3 shows an exemplary asset/server relationship view 300 generated by the design tool 30. According to an aspect of the invention, the design tool 30 utilizes the hierarchal relationship for Forms (Parent/Child) to help organize and associate Assets (or Frames) 305 (parent documents representing, e.g., physical aspects) with servers 310 (child documents representing, e.g., logical aspects). More specifically, the information describing the Asset 305 may include, for example, the serial number, location, adaptors, and total reserves, amongst other information. The information describing the servers 310 include individual LPAR #1, LPAR #2, and LPAR #3 and information for each LPAR, which may include, for example, a function, software and allocated resources, amongst other information.

This asset/server relationship view 300 may be particularly useful for Assets (or Frames) that have the capability of multiple logical partitions (LPARs). As shown in FIG. 3, the hierarchal structure of the design tool view 300 associates the servers 310 with the Frame 305 and also provides a visual indication of this relationship. In embodiments, the asset/server relationship view 300 may be color-coded, e.g., with the different servers having different colors, to provide further visual cues of the asset/server relationships.

Architecture/Configuration

FIG. 4 shows an exemplary layout structure view 400 generated by the design tool 30. In embodiments, the layout structure may be displayed in a number of different views and can be easily exported or printed. As shown in FIG. 4, the layout structure view may include fields for the name 405, the serial number/ODCS hostname 410, the customer 415, the description of the assets and/or servers 420, the capacity values 425, engagement information ("E") 430, high availability cluster information ("HA") 435, and other relevant information (designated as "!") 440. More specifically, the engagement information ("E") 430 is used to identify the customer engagement that an LPAR is provisioned under. For example, engagements may include strategic outsourcing (SO), virtual server services (VSS), and flexible services offering (FSO), amongst other engagements. In embodiments, there might be different configurations required. depending on the engagement that a customer is under. Thus, the engagement information may be very helpful to a Delivery Architect.

In embodiments, the Delivery Architect may input data for the first row 445, which describes the parent/child hierarchy relationship discussed above. Rows 450 and 455 of FIG. 4 contain data representative of customer servers and may be input as a part of the Delivery Architect's business process of building a customer server. "CUoD" row 460 and "Cap Reserve" row 465 contain data representative of the CuoD and reserved resources of the asset, respectively, and may also be input by the Design Architect (usually when the Design Architect first inputs the physical system into the tool). As shown in the example of FIG. 4, there are 4 CuoD CPUS, 8 GB of RAM in capacity reserve. The design tool 30 may generate the data of "Available" row 470 by executing a calculation script, as described further below.

By virtue of documenting all the elements of an Asset or LPAR in the design tool 30, the relevant architecture may also be captured. For example, FIG. 4 shows the high-availability (HA) cluster relationship between the database (DB) server and its partner node (e.g., the special cluster configuration relationship of "NB*275" with "NB*274").

Figure 5:
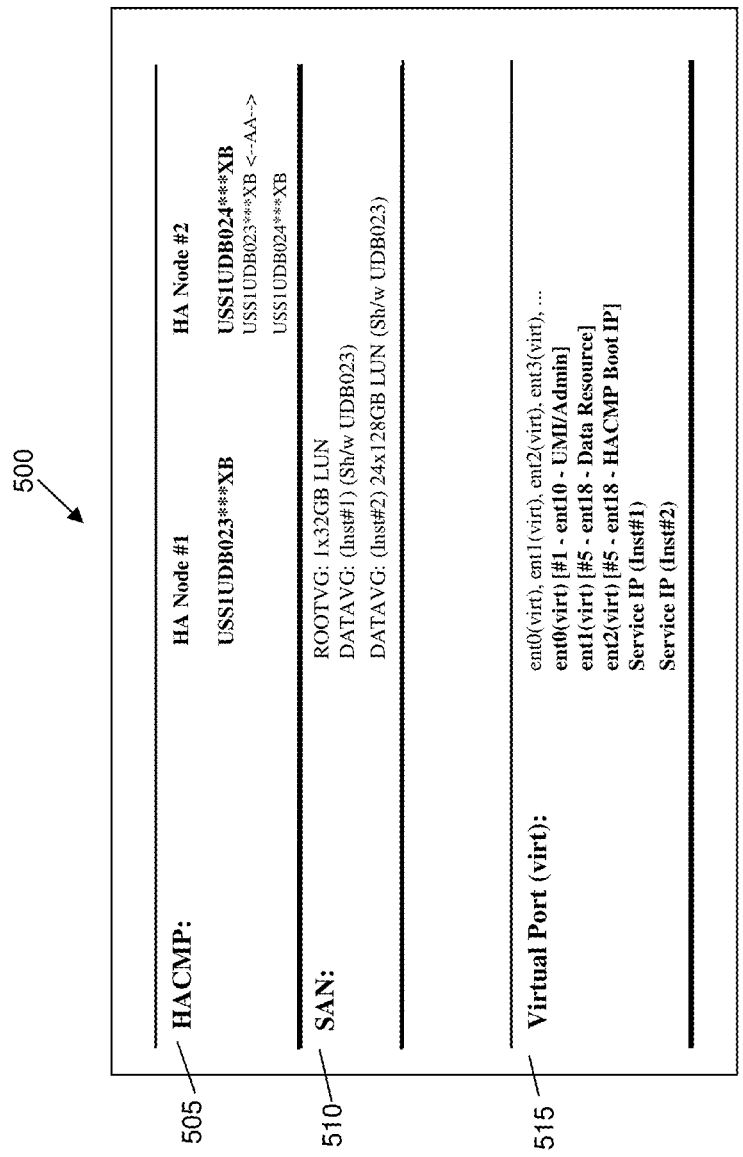
FIG. 5 shows an exemplary configuration view according to an aspect of the invention.

FIG. 5 shows an exemplary configuration view 500 generated by the design tool 30. In embodiments, by e.g., "clicking" on a particular server in the layout structure view 400 of FIG. 4, the design tool 30 may present the user, e.g., the Delivery Architect, with the configuration view 500 of FIG. 5. FIG. 5 shows critical configuration elements of an LPAR that help ensure a Delivery Architect adheres to the proper architecture. More specifically, FIG. 5 shows some exemplary configuration element details, which include high-availability cluster multiprocessors (HACMP) 505, storage area network (SAN) Volume Groups 510, and Port/VLAN (virtual local area network) assignments 515.

Resource Table Accounting

According to an aspect of the invention, the design tool 30 may determine and indicate the resources consumed by each server on a Frame. As new or changed architecture is known and inputted into the design tool 30, the design tool 30 makes the necessary adjustments for current or future planning requests. That is, as the design tool 30 knows what resources are being used, it can then tell the Delivery Architect what resources are available to be applied to new or existing LPARs.

The design tool 30, in performing the resource accounting, performs straight forward resource subtraction in addition to subtraction that includes, e.g., the manner in which resources are used or not used. That is, the information pertaining to all the other architectural aspects, e.g., the manner in which resources are used or not used, is input into the design tool 30 by the Delivery Architect, making the design tool 30 architecturally "aware". In addition to indicating to a Delivery Architect how much capacity is being used in total, or is allocated to a single LPAR, the design tool 30 may account for reserved resources.

For example, capacity reserve is an administrative reserve, which provides a Delivery Architect the ability to "tuck away" CPU or RAM and exclude it from available resources during the resource accounting in the design tool 30. This may be very helpful in reserving, or hedging capacity commitments, e.g., for contractual obligations, anticipated surges in demand, or for other reasons. Additionally, capacity reserve can also be extended to reserve resources for a particular customer in a shared resource environment. Since multiple customers may share the same physical asset, and multiple Delivery Architects are working on projects to create new LPARs, finding resources often becomes competitive. Having the ability to reserve capacity on an asset (assuming appropriate business guidelines in regards to customer priority) can ensure that the customer receives the reserved capacity they requested; instead of the capacity potentially being given to another customer. Additionally, in embodiments, a prioritization scheme is used to "bump" one customer's reserved capacity for another customer's reserved capacity, if a business, e.g., a service provider, decided to make such a decision.

In embodiments, the design tool 30 may account for the consumed resources in both fixed systems and virtual systems. A fixed system is one that uses fixed resources, which include, for example, a CPU, a hard drive, or a network adapter assigned, or fixed, to a single server or LPAR. In contrast, using virtual systems, or micro-partitioning, a CPU, for example, may be subdivided for use by multiple servers or LPARs.

FIG. 6 shows an exemplary hardware resource table 600 for a fixed system. More specifically, FIG. 6 is an output view of the design tool 30, which shows the resources consumed by each server on a single Frame, as determined by the design tool 30. According to an aspect of the invention, the installed resources (those that may be important to the architectural arrangement) may be displayed in the hardware resource table 600.

More specifically, as shown in FIG. 6, the exemplary hardware resource table 600 contains columns for a description of resources 605, the number of resources installed 610, the number of resources allocated 615, the number of resources reserved 620, and the number of resources available 625. Moreover, the hardware resource table 600 may contain rows for information on the hardware resources. Thus, for example, the hardware resource table 600 may contain rows for each of: fixed logical partitions (FLPARs) 630, CPs or central processing units 635, random access memory (RAM) 640, host bus adapters (HBA) 645, which may be, e.g., fiber adapter ports, hard disk drives (HDD) 650, disk configurations 655, and ports 660, amongst other rows. Additionally, the hardware resource table 600 may include a field for a number of fixed resources 665, which represents fixed resource LPARs. A fixed resource is, for example, a dedicated CPU, hard drive, or a network adapter assigned to a single server or LPAR.

According to the invention, the user, e.g., a Delivery Architect using the design tool 30, may input the values of the "Description" column 605, "Installed" column 610, the "Allocated" column 615, and the "Reserved" column 620 into the design tool 30.

In embodiments, the design tool 30 utilizes, e.g., LOTUSSCRIPT® to account for the resources consumed by each server on a Frame and to determine the values for the "Available" column 625. (LotusScript is a registered trademark of International Business Machines Corporation in the United States, other countries, or both.) More specifically, to determine the available resources, the design tool 30 may subtract the sum of the resources allocated to each server from the total resources installed on the Frame. In addition, in embodiments, for those resources subject to "reserve", the design tool 30 may subtract any resources reserved by the Delivery Architect for capacity planning purposes (but not yet activated) from the total installed resources. The remaining resources, after the design tool 30 subtracts the allocated and reserved resources (if applicable) from the installed resources, are the available resources on that Frame. The design tool 30 may indicate the available resources in the "Available" column 625. These available resources can then be applied to existing or new LPARS.

As shown in the example of FIG. 6, there are enough fixed resources to accommodate about eight Fixed LPARs. Thus, as shown in FIG. 6, for example, the Delivery Architect may input this value into the installed field for the FLPAR row 630. To determine the number of available FLPARs, the design tool 30 subtracts the number of allocated FLPARs from the total number of FLPARs installed. Thus, in the example shown in FIG. 6, the design tool 30 determines the total number of available FLPARs, which is five, by subtracting the number of allocated FLPARs, which is three, from the total number of installed FLPARs, which is eight. As an additional example, the design tool 30 determines the total number of available RAM (which in this example comprises 8 GB dual in-line memory modules (DIMMs)), which is eight, by subtracting the number of allocated RAM, which is forty-eight, and by subtracting the number of reserved RAM, which is eight, from the total number of installed RAM, which is sixty-four.

Moreover, as shown in FIG. 6, the reserved resources may be noted as reserved for Capacity Upgrade On Demand (CUoD). CUoD is a fast, non-disruptive method of activating "extra" processor capacity built directly into a server. Using CUoD, a client, e.g., a business, may activate additional processors and pay only for the new processing power as their needs grow. CUoD enables businesses to add processor capacity as needed, permanently activating capacity to respond to increased business demands.

Figure 7:
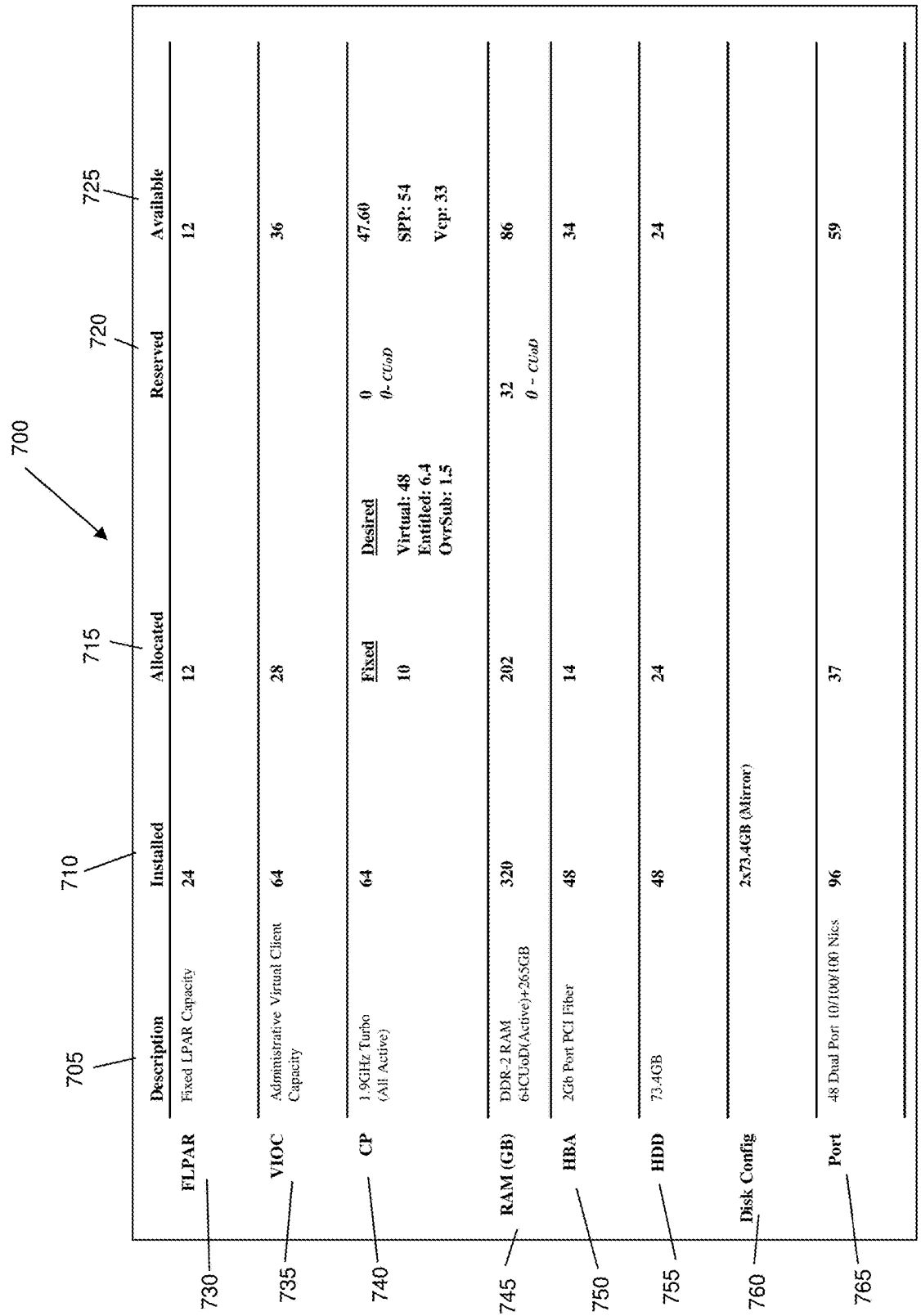
FIGS. 7 and 8 show exemplary hardware resource tables for virtualized systems according to an aspect of the invention.

FIG. 7 shows an exemplary hardware resource table 700 for a virtualized system. More specifically, FIG. 7 is an output view of the design tool 30, which shows the resources consumed by each server on a single Frame and the available resources as determined by the design tool 30. The hardware resource table 700 is similar to the hardware resource table 600 of FIG. 6, however, the hardware resource table 700 includes allocations for both fixed resources and virtualized resources. As explained above, a virtualized system allows for the micro-partitioning of resources between multiple LPARS.

According to an aspect of the invention, the installed resources (those that may be important to the architectural arrangement) may be displayed in the hardware resource table 700. More specifically, as shown in FIG. 7, the hardware resource table 700 may contain columns for a description of the resource 705, the number of resources installed 710, the number of resources allocated 715, the number of resources reserved 720, and the number of resources available 725.

Moreover, the hardware resource table 700 may contain rows for hardware resource information. Thus, for example, the hardware resource table 700 may contain a row for the FLPARs 730, virtual input/output clients (VIOC) 735 (LPARs with micro-partitioning and virtual network resources, which have virtualized CPU and network resources), central processing units 740, random access memory (RAM) 745, host bus adapters (HBA) 750, hard disk drives (HDD) 755, disk configurations 760, and ports 765. In addition to accounting for fixed resources, the embodiment of FIG. 7 also accounts for virtualized resources.

According to the invention, the Delivery Architect, using the design tool 30, may input the values of the "Description" column 705, the "Installed" column 710, the "Allocated" column 715, and the "Reserved" column 720 into the design tool 30.

In a manner similar to that described with regard to FIG. 6, the design tool 30 may determine the available resources values shown in FIG. 7. More specifically, the design tool 30 subtracts the sum of the resources allocated from the total resources installed on the frame. Additionally, if applicable, the design tool 30 may subtract any resources not yet activated or 'reserved' by the architect for capacity planning purposes from the total installed resources.

Thus, using the example of FIG. 7, the design tool may determine the number of available CPUs by subtracting the allocated CPUs (both fixed and virtual) and the reserved CPUs from the installed CPUs. With the introduction of CPU virtualization in FIG. 7, the processes of the design tool 30 become more complicated than those as described with respect to FIG. 6. More specifically, the design tool 30 may account for some additional variables introduced by the concepts of fractional CPUs and oversubscription.

As shown in FIG. 7, the hardware resource table 700 may include a field in the "Allocated" column 715 allowing a Delivery Architect to pre-set a number of virtual CPUs. In this example, a Delivery Architect has pre-set the number of virtual CPUs to forty-eight.

The virtualized hardware resource table 700 may include a field, e.g., in the "Allocated" column 715 for inputting an oversubscription rate. Within an on-demand environment, a service provider may allow (e.g., via a contract) a customer to vary their use of, e.g., the CP resources within a range (e.g., ±25%). Therefore the on-demand service provider may account for the range of potential use of the shared resources using an oversubscription rate (OvrSub or OvrSub Rate).

Additionally, the hardware resource table 700 may include a field for indicating a shared processor pool (SPP). The SPP is a number of CPUs not fixed to a specific LPAR that may be divided or partitioned. Thus, as indicated by the design tool 30 and shown in FIG. 7, a Delivery Architect has input that there are sixty-four installed CPUs and that ten of those CPUs are fixed. Therefore, the design tool 30 determines that there are fifty-four CPUs in the SPP by subtracting ten from sixty-four.

The Delivery Architect has set the Virtual CPU Oversubscription factor for this frame to 1.5 (as indicated in the "OvrSub" field). According to the invention, the design tool 30 determines an amount of installed virtual CPUs (Vcp) by multiplying the oversubscription rate by the number of CPUs in the SSP. Thus, the amount of installed Vcps equals 1.5×54=81 (not shown). In embodiments, the design tool 30 may display the number of virtual CPUs in, e.g., the "Installed" column 710. Moreover, the design tool 30 may determine the available virtual CPUs by subtracting the desired virtual CPUs and the reserved virtual CPUs from the installed virtual CPUs. Thus, with the example of FIG. 7, the design tool 30 determines and indicates the available virtual CPUs=81−48−0=33.

RAM represents the amount of RAM installed and used in the Frame. As indicated by the design tool 30 and shown in FIG. 7, a Delivery Architect has input that this Frame has 320 GB of RAM physically installed. Additionally, 32 GB of RAM is being held in 'administrative reserve' by the Delivery Architect to, e.g., account for overhead and hedge performance estimates. The aggregate total of allocated RAM being used by ALL LPARs on the frame is 202 GB. The design tool 30 determines the available RAM by subtracting the allocated RAM and the reserved RAM from the installed RAM. Thus, with the example of FIG. 7, the design tool 30 determines and indicates the available RAM (that can be added to existing or new LPARs)=320−202−32=86.

As indicated by the design tool 30 and shown in FIG. 7, with regard to the host bus adaptor (HBA), a Delivery Architect has input that this Frame has 48 Ports installed, of which 14 are allocated and being used. Thus, the design tool 30 determines the available HBAs by subtracting the allocated HBA and the reserved HBA from the installed HBA. Thus, with the example of FIG. 7, the design tool 30 determines and indicates the available HBA=48−14=34.

As indicated by the design tool 30 and shown in FIG. 7, with regard to the HDDs, a Delivery Architect has input that this Frame has 48 HDD installed, of which 24 are being used. Moreover, the Disk Configuration row 760 indicates the configuration to be used by all Fixed Resource LPARs on the frame as, e.g., 2 drives configured for mirroring. Thus, the design tool 30 determines the available HDD by subtracting the allocated HDD and the reserved HDD from the installed HDD. Thus, with the example of FIG. 7, the design tool 30 determines and indicates the available HDD=48−24=24.

As indicated by the design tool 30 and shown in FIG. 7, with regard to the ports, a Delivery Architect has input into the design tool 30 that this frame has 96 Ports installed, of which 37 are allocated and being used. Thus, the design tool 30 determines the available ports by subtracting the allocated ports and the reserved ports from the installed ports. Thus, with the example of FIG. 7, the design tool 30 determines the available ports=96−37=59.

Figure 8:
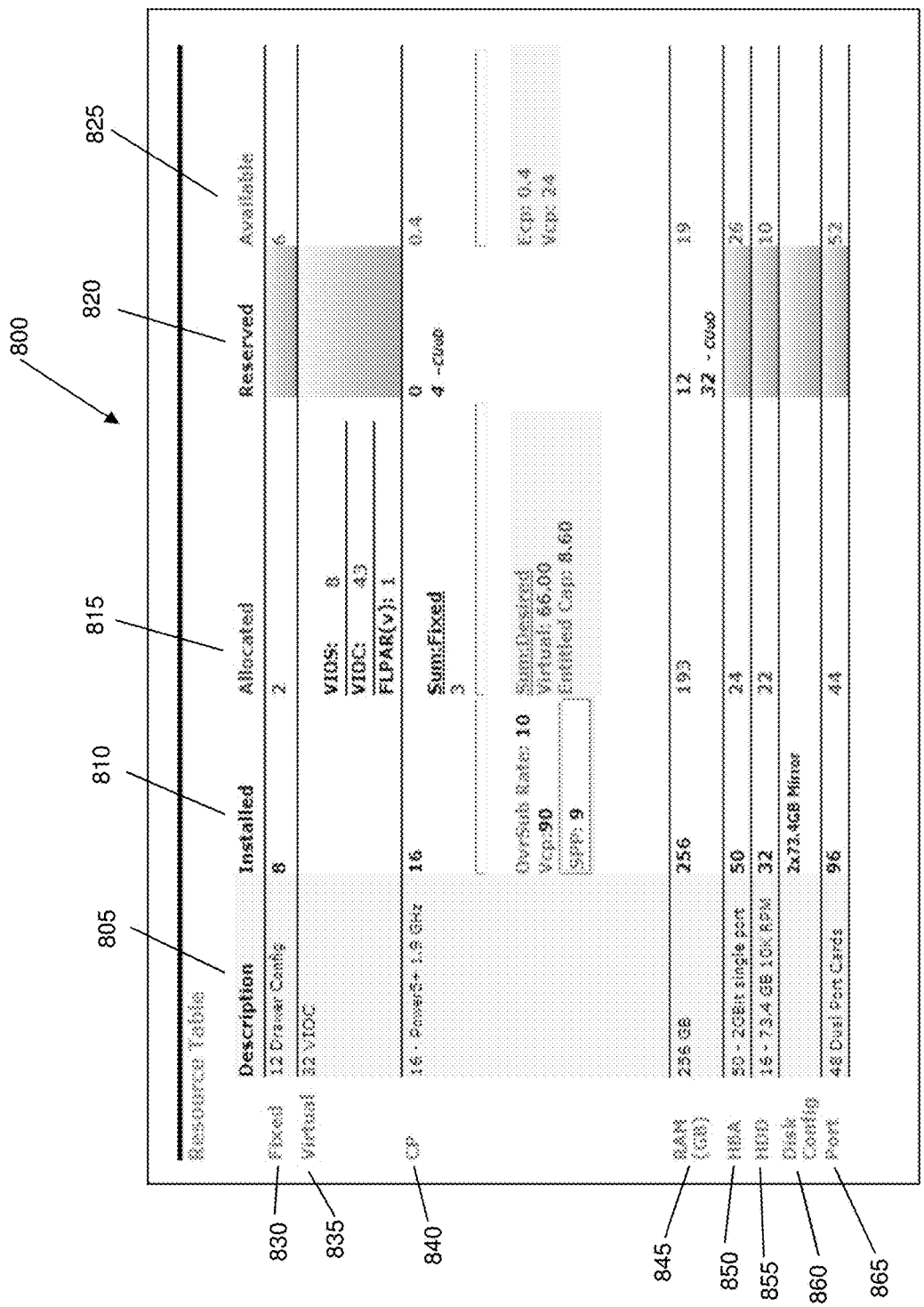

FIG. 8 shows another exemplary hardware resource table 800 for a virtual system. More specifically, FIG. 8 is an output view of the design tool 30, which shows the resources consumed by each server on a frame and the available resources as determined by the design tool 30.

According to an aspect of the invention, the installed resources (those that may be important to the architectural arrangement) may be displayed in the hardware resource table 800. More specifically, as shown in FIG. 8, the exemplary hardware resource table 800 contains columns for a description of the resources 805, the number of resources installed 810, the number of resources allocated 815, the number of resources reserved 820, and the number of resources available 825.

Moreover, the exemplary hardware resource table 800 may contain rows for the hardware resources. Thus, for example, the hardware resource table 800 may contain a row for the fixed resources 830, the virtual resources 835, central processing units 840, random access memory (RAM) 845, host bus adapters (HBA) 850, hard disk drives (HDD) 855, disk configuration information 860, and ports 865.

More specifically, the fixed resources 830 row represents fixed resource LPARs, including, e.g., dedicated CPU, hard drives, network adapters, which are not available for micro-partitioning. The virtual resources 835 row represents virtual resource LPARs. In embodiments, the virtual resources may include, for example, Virtual I/O Servers (VIOS), Virtual I/O Client (VIOC) and Fixed LPAR-variable (FLPAR(v)). More specifically, VIOS are LPARs that control all the virtualization and have virtualized CPU, but fixed network resources. VIOC are LPARs with micro-partitioning and virtual network resources. VIOC have virtualized CPU and network resources. Additionally, an FLPAR(v) is an LPAR that has virtualized CPU, but is using fixed resources. The FLPAR(v) is very similar to the VIOS, but FLPAR(v) are client LPARs and do not control any virtualization functions.

According to the invention, the Delivery Architect using the design tool 30, may input the values of the "Description" column 805, the "Installed" column 810 and the "Reserved" column 820 into the design tool 30. Thus, as shown in FIG. 8, a Delivery Architect has input that in this particular frame, there are 12 I/O drawers (indicated in the "Description" column 805) and only enough fixed resources to accommodate about eight Fixed LPARs (indicated in the "Installed" column 810). This Frame has two LPARs that are of the Fixed type (indicated in the "Allocated" column 815). Therefore, the design tool 30 determines that the frame can only accommodate six more Fixed type LPARs (indicated in the "Available" column 825).

Additionally, as shown in FIG. 8, the design tool 30 has determined that this particular Frame has eight VIOS LPARs, forty-three VIOC LPARs and one FLPAR(v) LPAR. More specifically, the Delivery Architect may input the various LPARS (VIOC, FLPAR, FLPAR(v)) into the design tool 30 as part of the normal business process of 'building' a server, as described with respect to FIG. 4. Then, the Delivery Architect may execute a calculation script of the design tool 30, which determines totals of the LPARs and displays the determinations in Allocated column 815 and the Available column 825 of the hardware resource table 800.

Moreover, the design tool also creates the available document in the "Available" row 470 of FIG. 4, which is merely another way of displaying the capacity information. This is a time saver, since the Delivery Architect would have had to use some side spreadsheet to keep track of all this information and do all the math. Having the design tool 30 keep track of the resources and do the math saves the Design Architect time and improves accuracy.

However, it should be understood that the data contained in the hardware resource table of FIG. 8 does not correlate with the data of the layout structure view of FIG. 4, as different examples were used for these different figures. However, if a layout structure view were created for the example shown in FIG. 8, that layout structure view would have 58 rows: 1$^{st}$ row being the asset (with the resource table inside it), then two rows for the 2 Fixed 1 pars, forty-three rows for the 43 VIOC, eight rows for the 8 VIOS, one row for the 1 FLPAR(v), one row for the 1 CuoD, one row for the 1 Cap Reserve and one row for the 1 Available.

Referring again to FIG. 8, the Delivery Architect has indicated that the Frame has a total of sixteen physical CPU (cores) installed. However, four of those sixteen CPUs are not active, but are in a reserved CUoD state. Of the remaining 12 CPUs, 3 of them are dedicated to Fixed resource LPARs (indicated in the "Allocated" column 815). Thus, the design tool 30 determines that nine CPUs remain available for the Shared Processor Pool (indicated in the "Installed" column 810 as "9 SPP").

The Delivery Architect has set the Virtual CPU oversubscription factor for this Frame to ten (indicated in the "Installed" column 810 as "OvrSub Rate 10"). According to the invention, the design tool 30 determines the virtual CPUs (Vcp) by multiplying the oversubscription rate by the number of CPUs in the SSP. Thus, with the example of FIG. 8, the number of installed Vcps equals 10×9=90.

As is further indicated by the design tool 30 and shown in FIG. 8, fifty-two LPARs are virtualized and participating in micro-partitioning. That is, 8 VIOS+43 VIOC+1 FLPAR(v) =52 LPARS.

The aggregate total for the desired Virtual CPU is indicated in the "Allocated" column 815 as 66 Vcp, as input by a Delivery Architect. According to the invention, the design tool 30 determines the available Vcp by subtracting the desired Vcp from the installed Vcp. Thus, with the example of FIG. 8, the design tool 30 determines the available Vcp=90−66=24.

Entitled capacity (Entitled Cap or Ecp) is a micro-partitioning term that essentially translates into CPU capacity. However, unlike virtual capacity (Vcp), entitled capacity cannot be oversubscribed. Therefore, the aggregate total for the desired entitled capacity must be less than the SPP value. As indicated by the design tool 30 and shown in FIG. 8, the aggregate total for the desired entitled capacity is 8.6 Ecp (as indicated in the "Allocated" column 815 as "Entitled Cap: 8.60"), as input by the Delivery Architect.

The design tool 30 may determine the available entitled capacity by subtracting the allocated entitled capacity from the shared processor pool (SPP). Thus, with the example of FIG. 8, the design tool 30 determines the available Ecp=9−8.6=0.4. Alternatively, the design tool 30 may determine the available entitled CP capacity by subtracting the allocated CP entitled capacity, allocated fixed CP, and the reserved CP from the installed CP. Thus, with the example of FIG. 8, the design tool 30 determines the available Ecp=16−8.6−3−4=0.4.

RAM represents the amount of RAM installed and used in the Frame. As indicated by the design tool 30 and shown in FIG. 8, an Delivery Architect has input that this frame has 256 GB of RAM physically installed. Additionally, 32 GB of RAM is configured as reserve CUoD and is inactive and 12 GB of RAM is being held in reserve, e.g., "administrative reserve" by the Delivery Architect to account for, e.g., overhead and hedge performance estimates. The aggregate total of allocated RAM being used by all LPARs on the frame is 193 GB. The design tool 30 determines the available RAM by subtracting the allocated RAM and the reserved RAM from the installed RAM. Thus, with the example of FIG. 8, the design tool 30 determines and indicates the available RAM (that can be added to existing or new LPARs)=256−193−12−32=19.

As indicated by the design tool 30 and shown in FIG. 8, with regard to the host bus adaptor (HBA), a Delivery Architect has input that this frame has 50 Ports installed, of which 24 are allocated and being used. Thus, the design tool 30 determines the available HBAs by subtracting the allocated HBA and the reserved HBA from the installed HBA. Thus, with the example of FIG. 8, the design tool 30 determines and indicates the available HBA=50−24=26.

As indicated by the design tool 30 and shown in FIG. 8, with regard to the HDDs, a Delivery Architect has input that this frame has 32 HDD installed, of which 22 are being used. Moreover, the Disk Config row 860 indicates the configuration to be used by all Fixed Resource LPARs on the frame (e.g., VIOS, Fixed, and FLPAR(v)) as 2 drives configured for mirroring, for the example of FIG. 8. Thus, the design tool 30 determines the available HDD by subtracting the allocated HDD and the reserved HDD from the installed HDD. Thus, with the example of FIG. 8, the design tool 30 determines and indicates the available HDD=32−22=10.

As indicated by the design tool and shown in FIG. 8, with regard to the ports, a Delivery Architect has input that this frame has 96 Ports installed, of which 44 are allocated and being used. Thus, the design tool 30 determines the available ports by subtracting the allocated ports and the reserved ports from the installed ports. Thus, with the example of FIG. 8, the design tool 30 determines and indicates the available ports=96−44=52.

Dashboard Views

According to a further aspect of the invention, the design tool 30 may provide one or more dashboard views to assist a Delivery Architect in designing the architecture and allocating the capacity requirements for a shared customer in the On Demand environment. In embodiments, the dashboard view may allow the Delivery Architect to view the available resources of many Frames at the same time in order to, e.g., quickly determine a suitable "home" for a new LPAR.

FIG. 9 shows an exemplary embodiment of a dashboard view 900 provided by the design tool 30. As shown in FIG. 9, the dashboard view 900 includes columns for hardware management console (HMC) information 930, serial numbers 935, names 940, and other information (designated as "!") 925. Additionally, the dashboard view may include groups of columns indicated by brackets 905, 910, 915 and 920. Each of these bracketed groups delineates the capacity data for a particular Frame. In embodiments, each group of these groups of columns indicated by brackets 905, 910, 915 and 920 may have a different background color (or other marking, e.g., a pattern) for some or all of the fields of the particular group, so that a Delivery Architect may quickly distinguish, view and assess the properties of the different Frames. In the exemplary dashboard view 900, these different frames are indicated by the distinct patterns shown in row 960. Within each of the groups of columns for a particular Frame, the dashboard view 900 indicates properties of the particular Frame. For example, within group 905, the dashboard view 900 indicates a number of LPARs ("L") 945, a number of CPUs ("CP") 950, and amount of RAM 955 for the Frame.

The dashboard view 900 also includes rows 970 for the different users or clients using the on demand data center (ODCS) resources. Thus, using the dashboard view 900, a Delivery Architect can easily and quickly determine which clients are using which Frames and where, e.g., on what Frames, spare capacity may exist.

FIG. 10 shows another exemplary embodiment of a dashboard view 1000 provided by the design tool 30. As shown in FIG. 10, in embodiments, the dashboard view 1000 includes columns for a name of a client 1005, a serial number or ODCS hostname 1010, a description of the Frame 1015 (including type and model, building, grid and HMC information), the capacity values 1020 (as determined by the design tool 30) including, e.g., Fcp, Ecp, Vcp and RAM, high-availability (HA) cluster information 1025 and other information 1030 (designated as "!").

Additionally, the dashboard view 1000 may include colored portions to aid the Delivery Architect. More specifically, in embodiments, at least the values column 1020 may include color-coded capacity ratings to indicate how close each Frame is to the maximum capacity. As shown in FIG. 10, each of the cells in the values column 1020 may be, e.g., color-coded, or include some other indicator. This is represented in FIG. 10 with the color indicators 1035, e.g., "(GREEN)". In embodiments, the colors may include red, yellow and green, with, for example, red indicating a capacity that is either at or close to a maximum, yellow indicating a capacity that is approaching a maximum, and green indicating a capacity that is not close to the maximum, as determined by the design tool. Thus, a Delivery Architect using the dashboard view 1000, may quickly determine where capacity may exist, e.g., on what Frames, to quickly determine where to locate, e.g., additional LPARs.

LPAR Containers

According to a further aspect of the invention, the design tool 30 may include LPAR containers. More specifically, in embodiments, there may be two 'containers' within the design tool 30 that act as a place to store LPARs (logical servers or partitions) that are not currently assigned to a physical asset.

A "Reserved" container is a place where a Delivery Architect can assemble an LPAR—documenting all the attributes and characteristics of the logical server—before actually assigning it to an Asset. This allows the Delivery Architect to create the LPARs even if they do not yet know to what hardware the LPARs will be boarded. This distributes the data-entry workload and allows the Delivery Architect to begin work right away, instead of waiting until the hardware solution is clearly defined (something that often is not clear right away). Later, when the hardware solution is defined, the LPAR may be attached to actual hardware solution.

Additionally, a "Discontinued" container may act as a permanent holding area for every LPAR that was ever defined in the environment. LPARS that are decommissioned may then be moved to the "Discontinued" container and remain. In embodiments, the "Discontinued" container may be a helpful reference, providing a historical record of the 'life-cycle' of a server.

Architect Alerting

In embodiments, the design tool 30 may alert the Delivery Architect with, e.g., a popup warning message if the Delivery Architect has allocated more resources, e.g., CPUs, than are actually available. In addition, other resources, like RAM, adapter ports or hard drives will show negative "Available" values, indicating more resources have been committed than are available. In both cases, the design tool 30 may assist the Delivery Architect by ensuring that the Delivery Architect does not over commit resources during the planning phase, e.g., by making typographical errors. If a Delivery Architect does receive an alert, they may immediately adjust their plans, instead of learning about an over-commitment of resources later from, e.g., a System Administrator who is trying to build the LPAR but cannot because there are insufficient available resources.

What-If Scenarios

According to a further aspect of the invention, because the design tool 30 is designed to be used prior to any actual build activity, the Delivery Architect can place LPARs and adjust resource allocations in order to find the best combination or to simply see what the design might look like. For example, the Delivery Architect can make adjustments to the Virtual CPU oversubscription rate for a micro-partitioned frame to determine resulting available virtual CPU capacity (Vcp) values.

Build Sheet Generation

An output of the Delivery Architect function is the documenting of specific build instructions into a "Buildsheet". The Buildsheet is a large, comprehensive spreadsheet used by System Administrators as the primary source of information that is needed to successfully build and configure assets and servers. The Buildsheet is vital and necessary in order to build servers, but it is cumbersome, complicated and requires intensive labor to maintain. Conventionally, each new version of a Buildsheet was the result of manual manipulation by either the Delivery Architect, or a NID (Network Implementation Design) Designer.

According to a further aspect of the invention, the design tool 30 provides several views within the design tool 30 that have a specific format, which allows the Delivery Architect to export the information to a file that can then be incorporated into a Master Buildsheet (e.g., a large spreadsheet). For example, the views may use document selection criteria and arrange the information in organized rows and columns. The export feature eliminates typing errors and provides a consistent format for all of the Delivery Architects. The export may be achieved, e.g., via a LOTUS NOTES export function.

In embodiments, the design tool 30 is first updated to reflect a Delivery Architect's plans, and the Buildsheet is then generated from the design tool 30, instead of the other way around. The information displayed in the Buildsheet view is specific to the assembly of the LPAR and is designed to replace the LPAR tabs. Additionally, in embodiments, networking information can be included to replace all of the tabs in a Buildsheet.

Architectural Drawing Generation

According to a further aspect of the invention, since much of the architectural information and relationships are already in the design tool 30, the design tool 30 may generate architectural drawings. In contrast to the Buildsheets, which may comprise more textual information about, e.g., the assets and servers for a particular LPAR, architectural drawings may comprise more graphical images, e.g., pictures and boxes, to describe the design, e.g., the assets and servers for a particular LPAR. In embodiments, a script may export the various data elements into a format understood by drawing programs, e.g., MICROSOFT VISIO®, or some other drawing engine. (VISIO is a registered trademark of Microsoft Corporation in the United States, other countries, or both.) Using the drawing program, the design tool 30 may generate a drawing that reflects the architectural information and relationships in the design tool 30.

Reality Check

In actuality, an assembled configuration may not match the designed architectural configuration as determined by the Delivery Architect. In embodiments, the design tool 30 may not have any links to live servers or other management hardware. Thus, accuracy of information in the design tool 30 may be dependent upon adherence to business processes. However, in alternative embodiments, a background checking routine may query, e.g., an actual system or a hardware management console (HMC), to determine if the actual configuration matches the architectural configuration, or drawing. This "Reality Check" would provide the Delivery Architect an assurance that the Asset or Server in question is actually configured in the same manner that was specified in the Delivery Architect's design tool 30.

Account Reference

According to an additional aspect of the invention, the design tool 30 may include an Account Reference Document for each customer represented in the design tool 30. This reference document may capture any account-specific architecture variations, rules, or customer preferences. For example, a customer may have a specific formula used to derive the Desired Entitled Capacity and Desired Virtual CPU values, while a service provider may have different internal formulas. Thus, the Account Reference document lets the Delivery Architect document these variations, ensuring that information is transparent and accessible to other Delivery Architects.

Hardware Procurement Process Integration

Since one of the roles of the Delivery Architect is to request quotes and orders for hardware configurations so the hardware can then be procured (by, e.g., a procurement team), a place to store (and more importantly refer to later) these quotes and orders can be important and useful. According to a further aspect of the invention, the design tool 30 may capture this information via a Hardware Order form. The requested configuration, as well as the project/date and other vital data may be recorded in the design tool 30. Subsequently, when the hardware arrives at, e.g., the data center, the original order and configuration information can easily be retrieved by the Delivery Architect. This allows the Delivery Architect to ensure verification that the equipment that arrived matches what was requested.

While the invention has been described in terms of embodiments, those skilled in the art will recognize that the invention can be practiced with modifications and in the spirit and scope of the appended claims.

What is claimed is:

1. A method implemented in a computer infrastructure having computer executable code, comprising:
    consolidating capacity architecture information comprising capacity data for installed, allocated and reserved resources;
    translating business requirements into information technology requirements which address a need for the capacity architecture information;
    determining available resources based on the capacity architecture information;
    modifying oversubscription values such that added capacity is included;
    performing capacity planning based on the capacity architecture information, the available resources, and the added capacity; and
    updating the capacity architecture information based on the capacity planning.

2. The method of claim 1, further comprising generating at least one of buildsheets and architectural drawings based on a best configuration.

3. The method of claim 1, further comprising generating at least one of:
    an asset/server relationship view;
    a layout structure view;
    a configuration view;
    a hardware resource table; and
    an at least one dashboard view.

4. The method of claim 3, wherein the at least one dashboard view includes data for a plurality of frames.

5. The method of claim 3, wherein the at least one dashboard view includes color-coded capacity ratings.

6. The method of claim 1, wherein the capacity architecture information further includes at least one of:
    fixed system capacity information; and
    virtualized system capacity information.

7. The method of claim 1, wherein the capacity architecture information further includes an oversubscription factor.

8. The method of claim 1, further comprising:
determining at least one of an available virtual capacity, an available entitled capacity, and a shared processor pool, based on the capacity architecture information; and
displaying an indication of at least one of the available virtual capacity, the available entitled capacity, and the shared processor pool.

9. The method of claim 1, wherein the installed resources comprise at least one of:
fixed logical partitions (FLPARs);
central processing units (CPUs);
random access memory (RAM);
host bus adaptors (HBAs);
hard disk drives (HDDs); and
ports.

10. The method of claim 9, wherein the installed resources further comprise at least one of:
logical partitions (LPARs);
virtual input/output clients (VIOC);
virtual input/output servers (VIOS); and
fixed logical partitions-variable (FLAPR-v).

11. The method of claim 1, further comprising performing test scenarios by altering at least one of:
the installed resources;
the allocated resources;
the reserved resources;
an oversubscription factor;
a virtual capacity;
an entitled capacity;
fixed system capacity information; and
virtualized system capacity information.

12. The method of claim 1, further comprising at least one of:
storing a design of a logical server in a reserved container prior to assigning the design to a frame; and
storing a design of the logical server in a discontinued container after the logical server has been decommissioned.

13. The method of claim 1, further comprising:
determining, based on the capacity planning, a plurality of resource configurations that satisfy requirements of a request for capacity from a client or a customer, the plurality of resource configurations including respective pluralities of the available resources; and
receiving a selection of a first resource configuration of the plurality of resource configurations from a user; and
reserving the plurality of available resources of the first resource configuration to prevent assignment of the plurality of available resources of the first resource configuration to another resource configuration by other users.

14. A computer infrastructure comprising:
a processor;
a computer-readable hardware storage device; and
program code stored on the computer-readable hardware storage device for execution by the processor, the program code comprising:
program code that consolidates capacity architecture information comprising capacity data for installed, allocated and reserved resources;
program code that translates business requirements into information technology requirements which address a need for the capacity architecture information;
program code that determines available resources based on the capacity architecture information;
program code that modifies oversubscription values such that added capacity is included; and
program code that displays an indication of the available resources and the added capacity for allocation of the available resources.

15. The computer infrastructure of claim 14, further comprising program code that generates at least one of:
an asset/server relationship view;
a layout structure view;
a configuration view;
a hardware resource table; and
at least one dashboard view.

16. The computer infrastructure of claim 14, further comprising program code that collects at least one of:
fixed system capacity information; and
virtualized system capacity information.

17. The computer infrastructure of claim 14, wherein the installed resources comprise at least one of:
fixed logical partitions (FLPARs);
central processing units (CPUs);
random access memory (RAM);
host bus adaptors (HBAs);
hard disk drives (HDDs);
ports;
logical partitions (LPARs);
virtual input/output clients (VIOC);
virtual input/output servers (VIOS); and
fixed logical partitions-variable (FLAPR-v).

18. The computer infrastructure of claim 14, further comprising:
program code that determines, based on the available resources, a plurality of resource configurations that satisfy requirements of a request for capacity from a client or a customer, the plurality of resource configurations including respective pluralities of the available resources;
program code that receives a selection of a first resource configuration of the plurality of resource configurations; and
program code that reserves the plurality of available resources of the first resource configuration to prevent assignment of the plurality of available resources of the first resource configuration to another resource configuration.

19. A computer program product comprising a computer readable hardware storage device having readable program code stored in the computer readable hardware storage device, the program code comprising:
program code that consolidates capacity architecture information comprising capacity data for installed, allocated and reserved resources;
program code that translates business requirements into information technology requirements which address a need for the capacity architecture information;
program code that determines available resources based on the capacity architecture information;
program code that modifies oversubscription values such that added capacity is included; and
program code that displays an indication of the available resources and the added capacity for allocation of the available resources.

20. The computer program product of claim 19, further comprising:
program code that determines, based on the capacity planning, a plurality of resource configurations that satisfy requirements of a request for capacity from a client or a customer, the plurality of resource configurations including respective pluralities of the available resources;

program code that receives a selection of a first configuration of the plurality of configurations; and program code that reserves the plurality of available resources of the first resource configuration to prevent assignment of the plurality of available resources of the first resource configuration to another resource configuration.

\* \* \* \* \*